(12) United States Patent
Ubillos

(10) Patent No.: US 7,707,510 B1
(45) Date of Patent: Apr. 27, 2010

(54) IMPORT DIRECTLY INTO SPECIFIED FOLDERS AND USER INTERFACE

(75) Inventor: Randy Ubillos, Los Altos, CA (US)

(73) Assignee: Apple Inc., Cupertino, CA (US)

( * ) Notice: Subject to any disclaimer, the term of this patent is extended or adjusted under 35 U.S.C. 154(b) by 687 days.

(21) Appl. No.: 11/207,285

(22) Filed: Aug. 19, 2005

(51) Int. Cl.
*G06F 3/00* (2006.01)

(52) U.S. Cl. .................. 715/769; 715/770; 715/788; 715/859; 715/857; 715/748

(58) Field of Classification Search .............. 715/769, 715/770, 788, 859, 857, 748
See application file for complete search history.

(56) References Cited

U.S. PATENT DOCUMENTS 6,823,495 B1 * 11/2004 Vedula et al. ............... 715/805

2005/0038530 A1 * 2/2005 Nagasaka et al. ............. 700/19
2008/0072144 A1 * 3/2008 Chen et al. .................. 715/266
2008/0141174 A1 * 6/2008 Kodosky et al. ............ 715/835
2009/0044140 A1 * 2/2009 Chen et al. .................. 715/770

\* cited by examiner

*Primary Examiner*—Weilun Lo
*Assistant Examiner*—Mylinh Tran
(74) *Attorney, Agent, or Firm*—Hickman Palermo Truong & Becker LLP

(57) ABSTRACT

A user desiring to import digital images from a specified location may select that location. In response, a graphical element such as an arrow will be displayed with the beginning point of the element visually associated with the location. The user may then select a destination for the digital images. In response, the graphical element will be displayed with the ending point visually associated with the destination. In one embodiment, this is accomplished by having an arrow point as the graphical element. In one embodiment, graphical controls are located on the arrow. In response to a user clicking these controls, the digital images may be imported from the origin to the destination, or the process may be cancelled.

18 Claims, 2 Drawing Sheets

IMPORT DIRECTLY INTO SPECIFIED FOLDERS AND USER INTERFACE

FIELD OF THE INVENTION

The present invention relates to digital file management, and more specifically, to a user interface technique graphically indicating copying, or otherwise transferring, a digital file from an origin to a destination.

BACKGROUND

One of the primary benefits of digital photography is the ability to take photographs without worrying about the relatively high per-photo cost of film and development. As a result, people may take several digital photographs as opposed to one film photograph. While this has its advantages, a drawback is the sheer number of digital files created and the difficulty of organizing the files on a computer.

Most digital cameras use a portable storage medium on which to store digital image files. In order to most conveniently view, organize and edit the images, these files must be transferred from the portable storage medium to a more persistent storage such as the hard drive of a computer.

Several methods exist to accomplish this function. One is to connect the digital camera to a computer via a data transfer cable such as USB or FireWire. Some operating systems offer a "wizard" or other system for easing the difficulty of transferring the images; however, these methods are usually performed with a multitude of confusing "dialog boxes" or similar Graphical User Interface (GUI) elements. A user has little to no visual feedback on the source of the images, the destination of the images, and the method to initiate or cancel the transfer.

Other techniques exist whereby the camera's storage medium may be "mounted" in a computer's operating system much like a hard drive. One example of this is a flash storage medium such as a Compact Flash card being inserted into a "reader" which is usually connected to a computer via a data transfer cable. Using this approach, users may perform actions on the digital image files much like they would with any other file. In a command-line environment, command-line tools may be employed to transfer the images from the portable media to a hard drive, for example. The lack of visual feedback offered by this method is obvious. With a GUI environment, digital image files may be "dragged" to their desired destination arid a copy function may be automatically engaged.

The drawback to the GUI approach is the same drawback that exists with any GUI operating system wherein users must manipulate files in a "tile-folder" metaphor. The desired location may be a folder nested 5 levels deep, or into a folder so cluttered that the images are not easily retrievable without effort.

There exist applications to assist users in importing and managing digital images, Some of these applications allow a user to create separate folders within which to store images, thereby easing the task of cataloging images. Some applications do not physically store the images in these folders, but operate as a database where the folder merely offers a convenient method of organization. The files themselves may not be stored in the folder, but merely a symbolic copy associated with the destination.

While the prior approaches may ease the task of importing and cataloguing images, there exists a need for a way to directly import digital images to a specified folder and provide graphical feedback to guide the user.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

Figure 1:
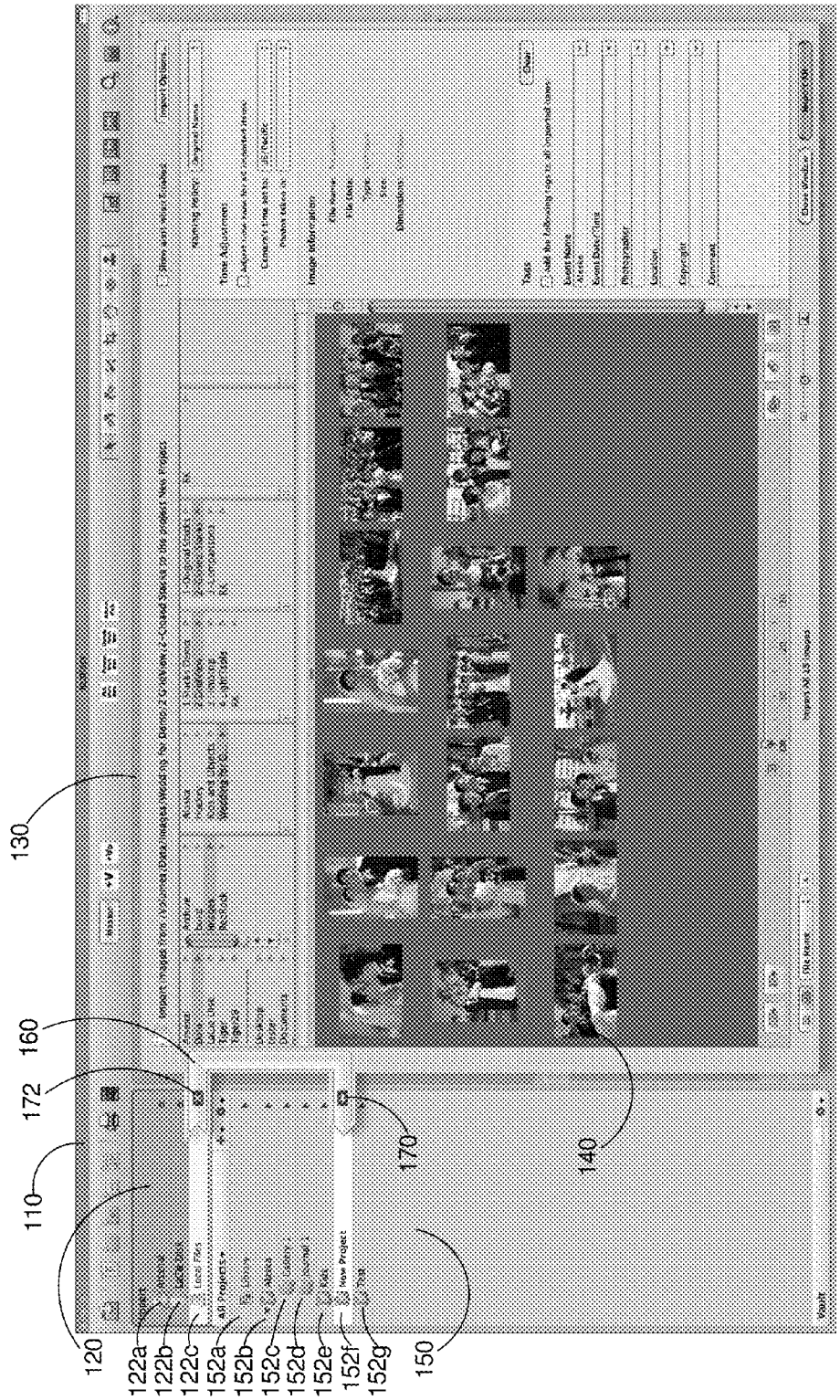
FIG. 1 is a block diagram illustrating a direct image import and the associated user interface, according to an embodiment of the invention.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Overview

According to techniques described herein, a user desiring to import digital images from a specified location may select that location. In response, a graphical element such as an arrow will be displayed with the beginning point of the element visually associated with the location. The user may then select a destination for the digital images. In response, the graphical element will be displayed with the ending point visually associated with the destination. In one embodiment, this is accomplished by having an arrow point as the graphical element. In one embodiment, graphical controls are located on the arrow. In response to a user clicking these controls, the digital images may be imported from the origin to the destination, or the process may be cancelled.

Digital Image Importation and Organization

Digital images may be stored on various types of media. For example, digital image files may be stored on a floppy disk, a hard disk, a CD-Rom, or "flash media," to name a few. These image files often need to be moved, copied, catalogued or organized in some way. For example, a Compact Flash card may have reached its storage capacity. In order to store more files on the card, room must be freed. In order to do this without deleting the images permanently, a user may simply copy the image files to another storage medium and erase the Compact Flash card, enabling new pictures to be stored. In some cases, a user simply may want to copy images from one location to another.

In another example, a user may desire to organize the stored image files in some way. For example, a computer application may offer the ability to "import" images to specific locations. In one embodiment, this would be accomplished by selecting a location containing the images to be imported. Then, a user would create or select a destination for the images. This location may be a physical one, such as a specific folder in a file system, or may be representative in nature, such as "projects" that collect varying user-specified groups of digital images. For purposes of this application, a "symbolic copy" shall be construed to mean any act where a physical copy is not made in the designated destination location. In either case, the images, once imported physically or symbolically copied, will be available for selection or use at the destination.

In one embodiment, this "importation" may be into any number of user-created "projects," or symbolic collections of related images. For example, a user may utilize an application that allows the creation of folders, projects or collections within which to collect related images. In one example, a user may create a "birthday" project. The user may then import digital images from a recent birthday party, stored on a hard drive or external storage, into this folder. While the image files themselves are not necessarily copied to this symbolic location, pointers or database techniques are used to relate the image files to the project. Later, when the user wishes to view or edit the photos associated with the "birthday" project, he may simply click on the visual representation of the "birthday" project (e.g., a folder icon) and all digital images previously imported into the project will be available for viewing, editing, or other use.

According to techniques described herein, a computer technique provides visual feedback to illustrate the importation of digital images. In one embodiment of the invention, this visual feedback is provided in the form of an animated arrow that visually represents the origin and destination of the importation of digital images.

According to one embodiment, a user is presented with an interface that visually represents source locations from which digital images may be imported. In this embodiment, a user may visually browse the file structure of the source locations and locate specific images or collections of images to be imported. In the embodiment illustrated by FIG. 1, a user is presented with a display 110 containing a collection of devices 120 from which to import images, such as the primary hard drive 122C, an inserted CD-Rom 122B, and an attached Compact Flash card 122a. In the embodiment of FIG. 1, the user has selected the primary hard drive 122C, and in response, the user is presented with a graphical display of the contents of the selected device 130. The user has navigated the hard disk thusly: Data→images→Wedding for D . . . →2 Gridview→2-Closed Stacks.

Further in FIG. 1, the user is presented with a listing of projects within which images may be imported 150. Of these projects, the user has selected "New Project" 152f. In response to this selection, digital image files residing in or associated with "New Project" are displayed in thumbnail form 140.

In response to the user selecting the primary hard drive 122C, the primary hard drive 122C is established as the source location. In response to the user selecting the "New Project" folder 152f, the "New Project" folder 152f is established as the destination location for the image import. In response to the selection of both the source location and the destination location, a visual association 160 is created between the source location and the destination location. In this embodiment, the visual association is an arrow pointing from the source location 122C to the destination location 152f, but other embodiments of the visual association are envisioned, such as a line, and arc, or any other graphical item.

Another embodiment is envisioned where the visual association 160 appears after the selection of the source location, and changes to indicate the terminus only after the selection of the destination location. In another embodiment, the visual association 160 is always visible. In another embodiment, the visual association 160 defaults to one source location and destination location until the user requests otherwise; for example, the visual association 160 may persistently associate the primary hard drive of a system with a project containing all images ever imported. In another embodiment, the visual association defaults to the source location most recently mounted or otherwise made available to the user.

In the embodiment of FIG. 1, the digital images to be imported from the source location reside in the "2-Closed Stacks" folder of the source location, but the visual association only indicates the primary Hard Drive 122c as the source. Other embodiments are possible where the visual association originates at the actual folder from which the import is to be executed; therefore, no such limitation is suggested by the representation of FIG. 1.

In the embodiment of FIG. 1, if the user were to change the source location from the primary hard drive 122c to the CD-Rom drive 122b, the visual association would change so that the visual association 160 would originate from the CD-Rom drive 122b. Likewise, if the user were to change the destination location to the Test folder 152g, the visual association would change so that the visual association 160 would terminate at the Test folder 152g. Through this technique, a user is visually notified exactly where digital images will be imported from, and where the digital images will be imported to.

In one embodiment, icons may be located on, within, near, or away from the visual association 160. These icons may represent any number of actions to be performed on either the source or destination. In the embodiment represented by FIG. 1, an icon 170 is placed near the terminus point of the visual association 160 which, when activated, will initiate the image import. Various icons are envisioned to represent the import initiation control, and these icons may be located on, near, or away from the visual association 160.

In one embodiment represented by FIG. 1, another icon 172 is located on the visual association 160 near the source location. This icon 172, when activated, will cancel the image import. In one embodiment, activating this control will remove the visual association 160 from the display 110. The two icons and their representative actions are simply an example of what may be accomplished. Any number of icons of any type may be placed in any location to initiate or cancel actions related to the source location, destination location, or image import action. Further, various methods of activating the controls are envisioned.

Alternative embodiments of the invention are applicable to any type of digital file transfer or other action taken with digital files. For example, an alternative embodiment of the invention is applicable to digital files in a non-image context. The preceding description of an embodiment of the invention in the context of digital images should not be construed as a limitation on the invention.

For example, the disclosed technique could be used to visually associate any file location in a filesystem with any destination in a filesystem for any type of manipulation of digital files. One example would be to copy digital files from one folder to another folder in a GUI environment.

Hardware Overview

Figure 2:
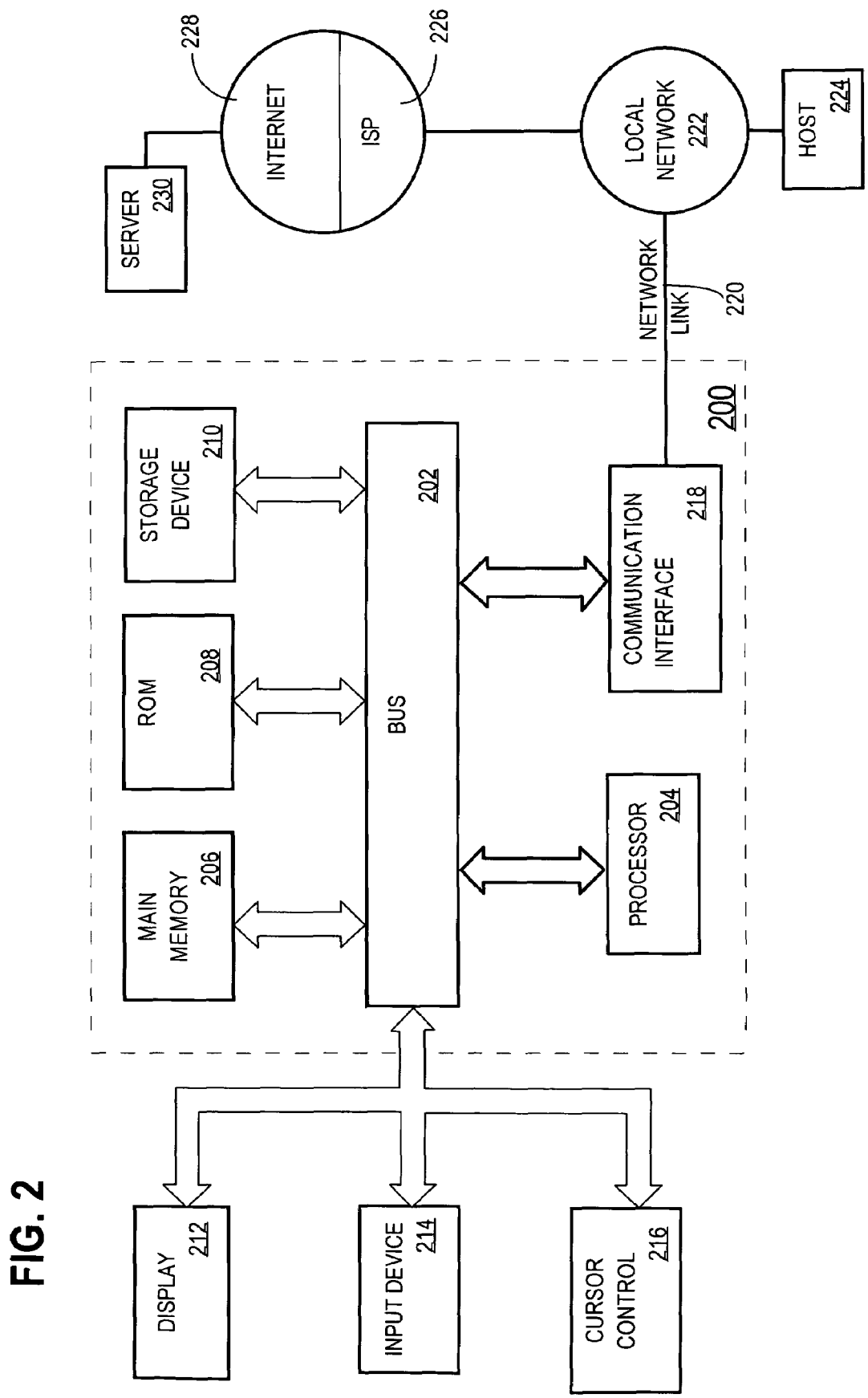
FIG. 2 is a block diagram of a computer system on which embodiments of the invention may be implemented.

FIG. 2 is a block diagram that illustrates a computer system 200 upon which an embodiment of the invention may be implemented. Computer system 200 includes a bus 202 or other communication mechanism for communicating information, and a processor 204 coupled with bus 202 for processing information. Computer system 200 also includes a main memory 206, such as a random access memory (RAM) or other dynamic storage device, coupled to bus 202 for storing information and instructions to be executed by processor 204. Main memory 206 also may be used for storing temporary variables or other intermediate information during execution of instructions to be executed by processor 204. Computer system 200 further includes a read only memory (ROM) 208 or other static storage device coupled to bus 202 for storing static information and instructions for processor 204. A storage device 210, such as a magnetic disk or optical disk, is provided and coupled to bus 202 for storing information and instructions.

Computer system 200 may be coupled via bus 202 to a display 212, such as a cathode ray tube (CRT), for displaying information to a computer user. An input device 214, including alphanumeric and other keys, is coupled to bus 202 for communicating information and command selections to processor 204. Another type of user input device is cursor control 216, such as a mouse, a trackball, or cursor direction keys for communicating direction information and command selections to processor 204 and for controlling cursor movement on display 212. This input device typically has two degrees of freedom in two axes, a first axis (e.g., x) and a second axis (e.g., y), that allows the device to specify positions in a plane.

The invention is related to the use of computer system 200 for implementing the techniques described herein. According to one embodiment of the invention, those techniques are performed by computer system 200 in response to processor 204 executing one or more sequences of one or more instructions contained in main memory 206. Such instructions may be read into main memory 206 from another machine-readable medium, such as storage device 210. Execution of the sequences of instructions contained in main memory 206 causes processor 204 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 200, various machine-readable media are involved, for example, in providing instructions to processor 204 for execution. Such a medium may take many forms, including but not limited to, non-volatile media, volatile media, and transmission media. Non-volatile media includes, for example, optical or magnetic disks, such as storage device 210. Volatile media includes dynamic memory, such as main memory 206. Transmission media includes coaxial cables, copper wire and fiber optics, including the wires that comprise bus 202. Transmission media can also take the form of acoustic or light waves, such as those generated during radio-wave and infra-red data communications.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 204 for execution. For example, the instructions may initially be carried on a magnetic disk of a remote computer. The remote computer can load the instructions into its dynamic memory and send the instructions over a telephone line using a modem. A modem local to computer system 200 can receive the data on the telephone line and use an infra-red transmitter to convert the data to an infra-red signal. An infra-red detector can receive the data carried in the infra-red signal and appropriate circuitry can place the data on bus 202. Bus 202 carries the data to main memory 206, from which processor 204 retrieves and executes the instructions. The instructions received by main memory 206 may optionally be stored on storage device 210 either before or after execution by processor 204.

Computer system 200 also includes a communication interface 218 coupled to bus 202. Communication interface 218 provides a two-way data communication coupling to a network link 220 that is connected to a local network 222. For example, communication interface 218 may be an integrated services digital network (ISDN) card or a modem to provide a data communication connection to a corresponding type of telephone line. As another example, communication interface 218 may be a local area network (LAN) card to provide a data communication connection to a compatible LAN. Wireless links may also be implemented. In any such implementation, communication interface 218 sends and receives electrical, electromagnetic or optical signals that carry digital data streams representing various types of information.

Network link 220 typically provides data communication through one or more networks to other data devices. For example, network link 220 may provide a connection through local network 222 to a host computer 224 or to data equipment operated by an Internet Service Provider (ISP) 226. ISP 226 in turn provides data communication services through the world wide packet data communication network now commonly referred to as the "Internet" 228. Local network 222 and Internet 228 both use electrical, electromagnetic or optical signals that carry digital data streams. The signals through the various networks and the signals on network link 220 and through communication interface 218, which carry the digital data to and from computer system 200, are exemplary forms of carrier waves transporting the information.

Computer system 200 can send messages and receive data, including program code, through the network(s), network link 220 and communication interface 218. In the Internet example, a server 230 might transmit a requested code for an application program through Internet 228, ISP 226, local network 222 and communication interface 218.

The received code may be executed by processor 204 as it is received, and/or stored in storage device 210, or other non-volatile storage for later execution. In this manner, computer system 200 may obtain application code in the form of a carrier wave.

Extensions and Alternatives

Alternative embodiments of the invention are described throughout the foregoing description, and in locations that best facilitate understanding the context of the embodiments. Furthermore, the invention has been described with reference to specific embodiments thereof. It will, however, be evident that various modifications and changes may be made thereto without departing from the broader spirit and scope of the invention. Therefore, the specification and drawings are, accordingly, to be regarded in an illustrative rather than a restrictive sense.

In addition, in this description certain process steps are set forth in a particular order, and alphabetic and alphanumeric labels may be used to identify certain steps. Unless specifically stated in the description, embodiments of the invention are not necessarily limited to any particular order of carrying out such steps. In particular, the labels are used merely for convenient identification of steps, and are not intended to specify or require a particular order of carrying out such steps.

Further, in the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method for manipulating digital files, the method comprising:
   simultaneously displaying a plurality of visual representations of a plurality of locations in which digital files may be stored;
   receiving a first user input that selects a first of said visual representations;
   in response to said first user input, establishing the location associated with said first selected visual representation as a source location;
   receiving a second user input that selects a second of said visual representations;
   in response to said second user input, establishing the location associated with said second selected visual representation as a destination location; and
   creating a directional visual representation spanning from said first visual representation to said second visual representation and indicating a direction from said first visual representation to said second visual representation;
   in response to a third user input, performing an operation that results in the creation at said destination location of a copy of a file that resides at said source location;
   wherein said third user input is initiated by selecting a control, wherein the control is located on or within said directional visual representation;
   wherein the step of creating a directional visual representation spanning from said first visual representation to said second visual representation comprises:
      displaying a source location indicator; and
      displaying a destination location indicator;
   wherein no portion of said directional visual representation is displayed before both said first and second user inputs are received.

2. The method of claim 1, wherein said directional visual representation is created in response to said first user input.

3. A computer-readable storage medium storing one or more sequences of instructions which, when executed by one or more processors, causes the one or more processors to perform the method recited in claim 2.

4. The method of claim 1, wherein said directional visual representation is displayed prior to receiving said first user input and is redisplayed in response to said first user input.

5. The method of claim 3, wherein said directional visual representation is redisplayed in response to said second user input.

6. A computer-readable storage medium storing one or more sequences of instructions which, when executed by one or more processors, causes the one or more processors to perform the method recited in claim 5.

7. A computer-readable storage medium storing one or more sequences of instructions which, when executed by one or more processors, causes the one or more processors to perform the method recited in claim 4.

8. The method of claim 1, wherein said copy is a symbolic copy.

9. A computer-readable storage medium storing one or more sequences of instructions which, when executed by one or more processors, causes the one or more processors to perform the method recited in claim 8.

10. The method of claim 1, wherein said operation results in the importation of digital image files.

11. A computer-readable storage medium storing one or more sequences of instructions which, when executed by one or more processors, causes the one or more processors to perform the method recited in claim 10.

12. The method of claim 1, wherein said directional visual representation comprises an arrow shape.

13. A computer-readable storage medium storing one or more sequences of instructions which, when executed by one or more processors, causes the one or more processors to perform the method recited in claim 12.

14. The method of claim 1, wherein said directional visual representation comprises a shape other than an arrow shape.

15. A computer-readable storage medium storing one or more sequences of instructions which, when executed by one or more processors, causes the one or more processors to perform the method recited in claim 14.

16. The method of claim 1, wherein said digital files comprise digital image files.

17. A computer-readable storage medium storing one or more sequences of instructions which, when executed by one or more processors, causes the one or more processors to perform the method recited in claim 16.

18. A computer-readable storage medium storing one or more sequences of instructions which, when executed by one or more processors, causes the one or more processors to perform the method recited in claim 1.

* * * * *

UNITED STATES PATENT AND TRADEMARK OFFICE
CERTIFICATE OF CORRECTION

PATENT NO.         : 7,707,510 B1
APPLICATION NO.    : 11/207285
DATED              : April 27, 2010
INVENTOR(S)        : Randy Ubillos et al.

It is certified that error appears in the above-identified patent and that said Letters Patent is hereby corrected as shown below:

In column 1, line 47, delete "arid" and insert -- and --, therefor.

In column 1, line 51, delete ""tile-folder"" and insert -- "file-folder" --, therefor.

In column 1, line 56, delete "images," and insert -- images. --, therefor.

In column 3, line 23, below "use." insert -- DIRECT IMAGE IMPORT --.

In column 8, line 10, in Claim 5, delete "claim 3," and insert -- claim 4, --, therefor.

Signed and Sealed this
Fifteenth Day of November, 2011

David J. Kappos
*Director of the United States Patent and Trademark Office*